June 11, 1929.  A. MARLAND  1,717,342
MANUAL HOLDER FOR ARC WELDING ELECTRODES
Filed Sept. 30, 1927
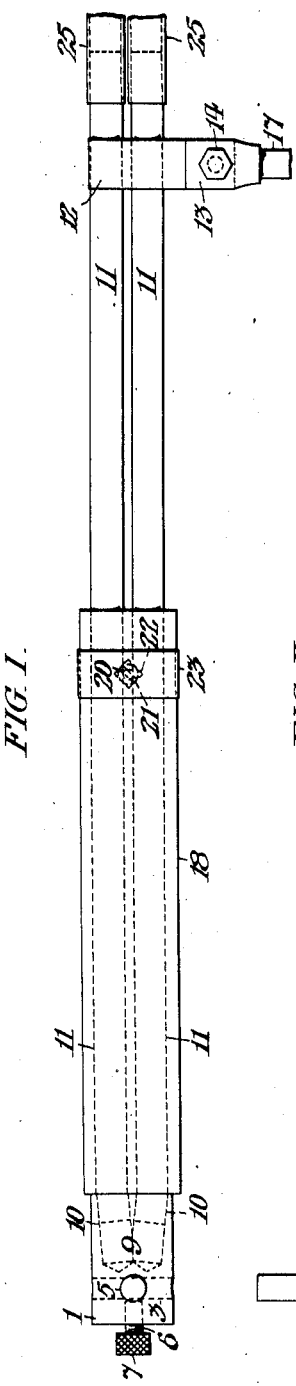
FIG. I.
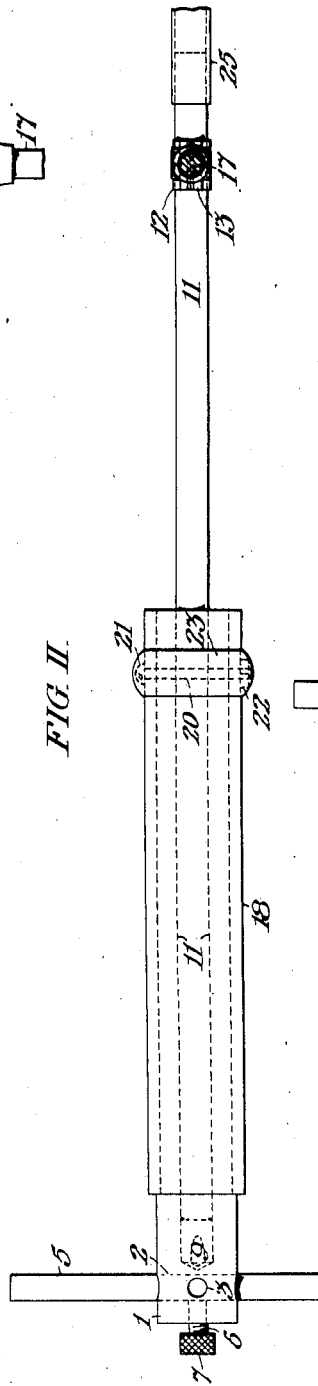
FIG. II.
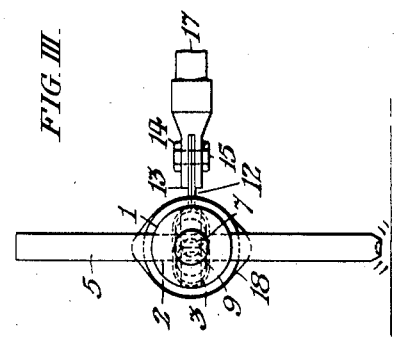
FIG. III.
INVENTOR:
ARTHUR MARLAND, Patented June 11, 1929.

1,717,342

UNITED STATES PATENT OFFICE.

ARTHUR MARLAND, OF CONSHOHOCKEN, PENNSYLVANIA, ASSIGNOR TO JOHN WOOD MANUFACTURING COMPANY, OF CONSHOHOCKEN, PENNSYLVANIA, A CORPORATION OF PENNSYLVANIA.

MANUAL HOLDER FOR ARC WELDING ELECTRODES.

Application filed September 30, 1927. Serial No. 223,077.

My invention relates to holders of the type forming the subject matter of Letters Patent of the United States No. 1,643,929, granted to me September 27, 1927, to wit, a holder arranged to detachably carry a carbon pencil electrode to permit the welding operator to manipulate the same with respect to the work to be welded. However, the holder hereinafter described may be used to manipulate metallic electrodes which are fused in the arc to deposit metal therefrom upon the work.

Such holders must be firmly grasped to manipulate the same with the accuracy required for the welding operation and, unless means are provided to artificially cool the same, such holders become so hot during a short period of use that it is impossible for the operator to retain his grasp thereof and, consequently, the welding operation must be stopped until the heat has dissipated from the holder to such a degree that the operator may resume his grasp thereof. However, it is characteristic of my invention that the holders are continuously maintained at a working temperature by refrigerating means which may be circulated through the handle and in such relation with the electrode as to prevent oxidation of the latter except immediately adjoining the arc.

The object and effect of my present invention is to simplify and lessen the cost of the construction of such a cooled holder.

My invention includes the various novel features of construction and arrangement hereinafter more definitely specified.

In said drawings; Fig. I is a plan view of a holder conveniently embodying my invention.

Fig. II is a side elevation of said holder with an electrode clamped therein.

Fig. III is a front end elevation of said holder and electrode.

In said figures; the metal body 1, which is preferably cylindrical and formed of hard copper, has a plurality of apertures 2 and 3 extending therethrough transversely to its axis and preferably in the same plane; said apertures being of respectively different sizes to selectively hold electrodes 5 of different sizes. As above noted, said electrodes may be carbon pencils or metallic rods. The screw 6, preferably arranged in coaxial relation with said body 1 and provided with the milled head 7, is common to both of said electrode apertures 2 and 3 and arranged to selectively rigidly clamp electrodes 5 therein in any desired position of lateral adjustment. Said body 1 has an internal cooling chamber 9 wholly upon one side of said electrode apertures and conveniently formed by a pair of drilled holes spaced apart at the end of said body 1 to form respective refrigerant inlet and outlet ports 10, and converging inwardly toward the axis thereof, into communication with each other within said body.

The pair of pipes 11 are respectively fitted in and extend from said ports 10 in substantially parallel relation with each other and with the axis of said body 1, and are preferably held in rigid relation with said body by solder. Said pipes not only form a handle for said holder, but have means, conveniently exemplified by the metal strap 12, clip 13, bolt 14 and nut 15, for detachably connecting said holder with the electric cable 17 through which energy for the welding operation is supplied, by way of said pipes 11 to said electrode 5.

The tubular handle sheath 18, conveniently formed of asbestos composition, vulcanized fibre or other insulating material, is fitted over said pipes 11 and detachably rigidly connected therewith, conveniently by the screw bolt 20 extending transversely through said sheath between said pipes and having its head 21 and nut 22 upon respectively opposite sides of said sheath. I find it convenient to provide an insulating covering 23 on said sheath extending over said bolt head 21 and nut 22. Such covering may be formed of adhesive tape wrapped upon said sheath, or otherwise.

Said pipes 11 may be supplied with water or other refrigerant, which is caused to circulate to and from said cooling chamber 9, through flexible conduits 25, which may be slip fitted upon the ends of said pipes as indicated, or said pipes may be screw threaded and provided with any suitable form of couplings for connection with said conduits.

It may be observed that my improved holder above described is formed of less parts and, consequently, simpler and less costly to manufacture than the form of my invention illustrated in my copending application aforesaid; but that the general construction and arrangement thereof are within the scope of claims in that case.

However, I do not desire to limit myself to the specific details of construction and arrangement herein set forth, as it is obvious that various modifications may be made therein, without departing from the essential features of my invention, as defined in the appended claims.

I claim:

1. In a manual holder for arc welding electrodes, the combination with a cylindrical body of copper, having a plurality of apertures therethrough, in the same plane, transverse to its axis, for electrodes of different sizes, and a cooling chamber, wholly upon one side of said electrode apertures, including a pair of drilled holes forming inlet and outlet ports spaced apart at the end of said body and converging inwardly toward the axis thereof, into communication with each other within said body; of adjustable electrode clamping means, on said body, common to said electrode apertures, and arranged to selectively clamp electrodes therein, including a single screw in coaxial relation with said body; two pipes, respectively fitted in and extending rigidly from said ports, in substantially parallel relation with each other and with the axis of said body, and forming a handle for said holder; means, including a flexible metal strap fitted to said pipes, arranged for detachable connection with an electric cable; whereby energy for the electric welding operation may be supplied through said pipes and body; a tubular handle sheath, of insulating material, fitted over said pipes; and means detachably securing said sheath, including a screw bolt extending transversely through said sheath between said pipes, and a nut for said bolt; and an insulating covering on said sheath extending over the head of said bolt and nut.

2. In a manual holder for arc welding electrodes, the combination with a cylindrical body of copper, having a plurality of openings therethrough, transverse to its axis, for electrodes of different sizes, and a cooling chamber, wholly upon one side of said electrode openings, having inlet and outlet ports spaced apart at the end of said body; of adjustable electrode clamping means, on said body, arranged to selectively clamp electrodes therein; two pipes, respectively fitted in and extending from said ports, in substantially parallel relation with the axis of said body, and forming a handle for said holder; means, on said holder, arranged for detachable connection with an electric cable; whereby energy for the electric welding operation may be supplied through said pipes and body; a tubular handle sheath of insulating material, fitted over said pipes; and means detachably securing said sheath.

3. In a manual holder for arc welding electrodes, the combination with a metal body, having a plurality of apertures, transverse to its axis, for electrodes of different sizes, and a cooling chamber, wholly upon one side of said apertures; of adjustable electrode clamping means, on said body, including a screw; two pipes, respectively extending from said chamber in substantially rigid relation with said body, and forming a handle for said holder; means, whereby energy for the electric welding operation may be supplied through said pipes and body; and a sheath of insulating material, fitted over said pipes.

4. In a manual holder for arc welding electrodes, the combination with a metal body, having an aperture therethrough, for an electrode, and a cooling chamber, wholly upon one side of said electrode aperture; of adjustable electrode clamping means, on said body; two pipes, respectively extending from said chamber, in substantially rigid relation with said body, and forming a handle for said holder; and means, whereby energy for the electric welding operation may be supplied to said body solely through said pipes.

5. In a manual holder for arc welding electrodes, the combination with a cylindrical body of copper, having an aperture transverse to its axis for an electrode, and a cooling chamber wholly upon one side of said electrode aperture; of a handle member of insulating material rigidly connected with said body; and two pipes extending from said chamber through said handle and adapted to circulate a refrigerant in said chamber.

In testimony whereof, I have hereunto signed my name at Conshohocken, Pennsylvania, this fifth day of August, 1927.

ARTHUR MARLAND.